United States Patent [19]

Gode et al.

[11] Patent Number: 4,940,544

[45] Date of Patent: Jul. 10, 1990

[54] DECENTRAL WASTEWATER TREATMENT PROCESS

[75] Inventors: Peter Gode, Langenfeld; Jens P. Riebe; Lutz Jeromin, both of Hilden, all of Fed. Rep. of Germany

[73] Assignee: Henkel Kommanditgesellschaft auf Aktien, Dusseldorf, Fed. Rep. of Germany

[21] Appl. No.: 219,424

[22] Filed: Jul. 14, 1988

[30] Foreign Application Priority Data

Jul. 17, 1987 [DE] Fed. Rep. of Germany ....... 3723718

[51] Int. Cl.$^5$ ............................................. C02F 3/30
[52] U.S. Cl. ................... 210/603; 210/608; 210/610; 210/621; 210/630
[58] Field of Search ............... 210/603, 608, 610, 621, 210/630, 631, 605

[56] References Cited

U.S. PATENT DOCUMENTS

| | | | |
|---|---|---|---|
| 1,331,735 | 2/1920 | Wilson | 210/630 |
| 1,602,306 | 10/1926 | Langwell | 210/610 |
| 1,690,682 | 11/1928 | Imhoff et al. | 210/608 |
| 1,838,474 | 12/1931 | Buswell et al. | 210/608 |
| 2,029,702 | 2/1936 | Buswell et al. | 210/603 |
| 2,064,529 | 12/1936 | Fischer et al. | 210/603 |
| 3,878,303 | 4/1975 | Hashimoto | 210/631 |
| 4,029,575 | 6/1977 | Bykowski et al. | 210/630 |
| 4,246,099 | 1/1981 | Gould et al. | 210/621 |
| 4,311,593 | 1/1982 | Benjes et al. | 210/603 |
| 4,328,104 | 5/1982 | Hanke et al. | 210/610 |
| 4,491,522 | 1/1985 | Ishida et al. | 210/630 |
| 4,510,243 | 4/1985 | Haga et al. | 210/630 |
| 4,650,590 | 3/1987 | Beall | 210/691 |

FOREIGN PATENT DOCUMENTS

| | | |
|---|---|---|
| 866935 | 11/1978 | Belgium . |
| 0048675 | 3/1982 | European Pat. Off. . |
| 0121851 | 10/1984 | European Pat. Off. . |
| 1692423 | 4/1970 | Fed. Rep. of Germany . |
| 2207633 | 8/1973 | Fed. Rep. of Germany . |
| 2939169 | 4/1981 | Fed. Rep. of Germany . |
| 225983 | 8/1985 | Fed. Rep. of Germany . |
| 3419139 | 11/1985 | Fed. Rep. of Germany . |
| 3537310 | 5/1986 | Fed. Rep. of Germany . |
| 2235089 | 1/1975 | France . |
| WO83/1206 | 4/1983 | Int'l Pat. Institute . |
| 6150680 | 11/1986 | Japan . |
| 0060783 | 6/1970 | Luxembourg . |
| 0290126 | 4/1916 | Netherlands . |
| 1152703 | 5/1966 | United Kingdom . |

OTHER PUBLICATIONS

Biological Wastewater Treatment in a High Performance Reactor & Gravity Separator, NEBA GmbH & Co.

Gonzalez-Martinez, Simon and Norouzian, Miryoussef "Aerobic and anaerobic intermediate storage of activated sludge: efficiency study", Nov. 1984, Journal Water Pollution Control Federation, vol. 56, pp. 1173–1177.

Primary Examiner—Peter Hruskoci
Assistant Examiner—Christopher Upton
Attorney, Agent, or Firm—Ernest G. Szoke; Wayne C. Jaeschke; Henry E. Millson, Jr.

[57] ABSTRACT

A process for the treatment of wastewaters heavily polluted by fats, proteins and/or carbohydrates of vegetable or animal origin or their processing products by degradation by microorganisms in a continuous flow reactor without separation of fats and/or sludges, comprising passing the wastewasters through a first part of a reactor containing aerobic and anaerobic microorganisms to consume the free oxygen present in the water, with at least partial degradation of the pollutants to fermentation products, and on flowing through another, adjoining part of the reactor, the fermentation products and any pollutants still present are coverted in the presence of the anaerobic microorganisms into—predominantly—digester gas and biomass. Optionally, fertilizing and/or pH-stabilizing substances or other auxiliaries are added in order to reduce the susceptibility of the system to failure.

22 Claims, 1 Drawing Sheet

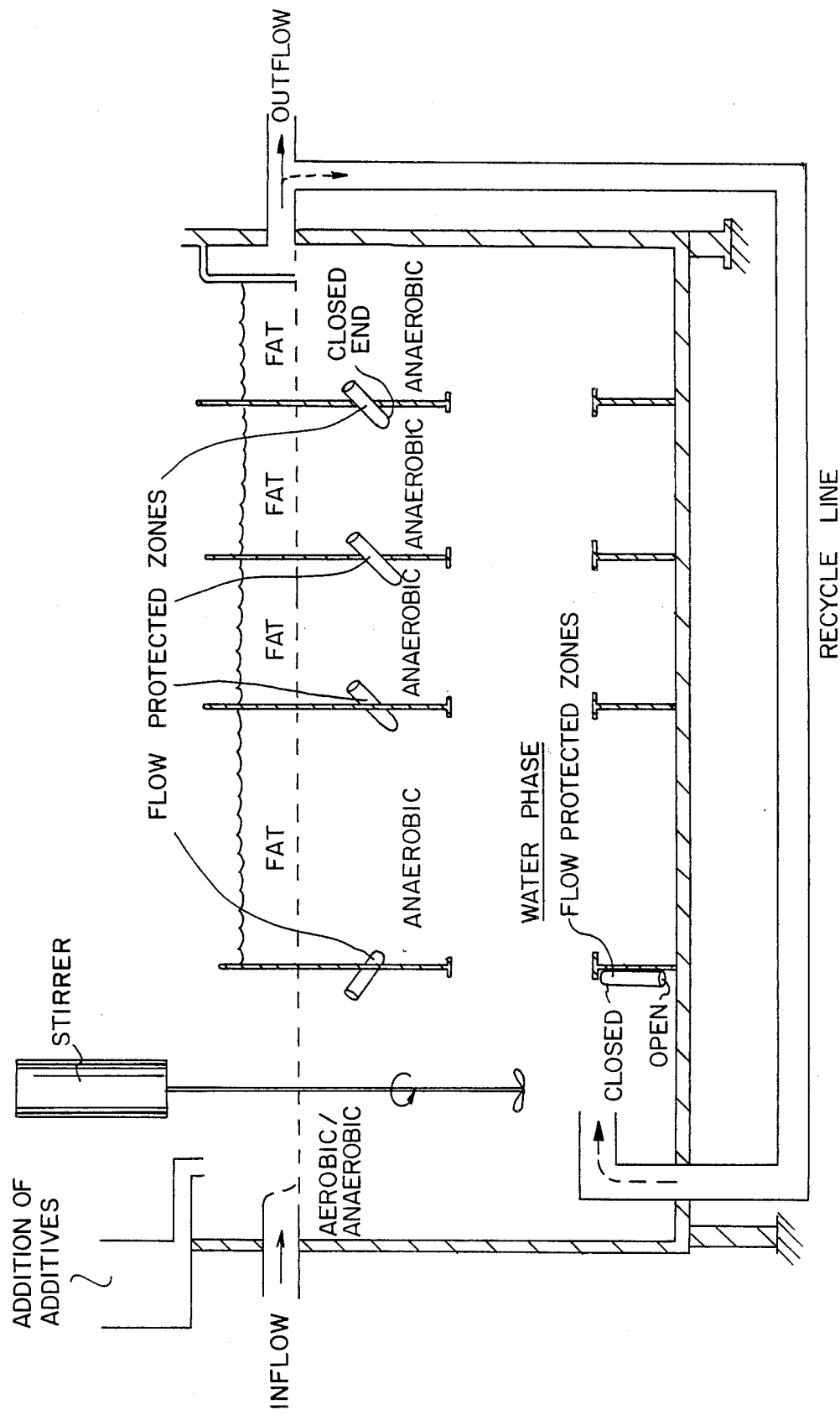

4,940,544

DECENTRAL WASTEWATER TREATMENT PROCESS

BACKGROUND OF THE INVENTION

1. Field of the Invention:

This invention relates to a process for the biological treatment in situ of wastewaters from factories in which animal and/or vegetable products are processed.

2. Statement of Related Art:

It is standard practice for wastewaters differing widely in composition to be mechanically and/or biologically cleaned in central treatment plants. Although central wastewater treatment processes can be operated very effectively, they are not optimally adapted to the requirements of the particular wastewater, require energy, and can be overloaded due to the large number of wastewater sources. In addition, central treatment plants have the disadvantage that, in the event of any failure, the entire wastewater stream has to be run off, inadequately treated, into receiving waters.

Accordingly, in the context of the increase in environmental awareness, discussions have recently centered around processes which enable special wastewaters to be pretreated in situ in decentral plants (so-called island solutions).

For example, dynamic bioreactors are well known among those skilled in the art (Prof. Brauer, Institut fur Chemie und Ingenieurtechnik der Techn. Universitat, Berlin). In bioreactors such as these, a lifting element fitted with perforated discs is reciprocated in a cylindrical vessel so that aerobic and anaerobic conditions can be established as required. Although very good treatment results are obtained in a confined space in this way, the presence of mechanically moving parts involves susceptibility to failure. In addition, the sequence of movements has to be controlled at considerable expense and, in the case of the aerobic variant, provision has to be made for the introduction of oxygen.

A so-called RMC separator bioreactor is described in a company booklet "Biologische Abwasserreinigung im Hochleistungsreaktor und Schwerkrafabscheider (Biological Wasterwater Treatment in a High Performance Reactor and Gravity Separator)" of NEBA GmbH & Co. KG, Postfach 1160, 6542 Heinburg 1. This reactor is, broadly speaking, a fat separator of the type commonly used in slaughterhouses and meat-processing factories which has been converted into an aerobic treatment system by addition of aerobic bacteria. The susceptibility to failure of this reactor and the relatively long regeneration times after a failure are disadvantages. In addition, because the reactor operates purely aerobically, the pollutants are largely converted into biomass which then has to be separated off in a following step or pollution of the drainage system results.

BRIEF DESCRIPTION OF THE DRAWING

The drawing is a block diagram of one embodiment of the process of the invention.

DESCRIPTION OF THE INVENTION

Other than in the operating examples, or where otherwise indicated, all numbers expressing quantities of ingredients or reaction conditions used herein are to be understood as modified in all instances by the term "about".

Against the above background, an object of the present invention is to provide a treatment process which produces good treatment results (considerable reduction in the load) in decentral systems and which, in addition, is distinguished by minimal susceptibility to failure and by brief regeneration times after a failure of the system during operation.

Another object of the invention is to provide a cleaning composition for food factories which, on entering the wastewater to be treated in the usual quantities, does not affect or even promotes the operation of the treatment plant. In addition, a further object of the invention is to provide disinfectants which, on entering the wastewater to be treated, do not significantly impede the operation of the treatment plant.

Accordingly, the present invention relates to a process for the treatment of wastewaters heavily polluted by fats, proteins and/or carbohydrates of vegetable or animal origin by degradation by microorganisms in a continuous flow reactor, wherein, without separation of any fat layer or sludge that may be present,

- on flowing through a first part of the reactor, the free oxygen present in the water is consumed by aerobic and anaerobic microorganisms with at least partial degradation of the pollutants to fermentation products, and
- on flowing through another, adjoining part of the reactor, the fermentation products and any pollutants still present are converted in the presence of the anaerobic microorganisms into—predominantly—digester gas and biomass, with, if desired, addition of fertilizing and/or pH-stabilizing substances or other auxiliaries in order to reduce the susceptibility of the system to failure.

The invention is based on the concept of carrying out the decentral treatment of wastewaters anaerobically in at least two steps. The function of the first step is to establish the conditions, namely absence of oxygen, for the anaerobic process by using up the oxygen through breathing. In addition, fermentation products are formed from the pollutants in this step, providing food for the microorganisms in the following step and being degraded by them with formation of digester gas. It has been found to be appropriate to carry out the two steps in separate chambers to take into account the different medium requirements, i.e. preferably an acidic pH in the first step and a more neutral to alkaline pH value and a very low redox potential in the second step.

In the process of the invention, the first step of the degradation process can be effected by a number of microorganism species. It is preferred to use mixed cultures such as occur, for example, in the activated sludge of communal sewage treatment plants or which establish themselves by air infection.

When the plant is started up, inoculation with activated sludge, use of other readily available sources, waiting until a lawn of bacteria has established itself through infection from the ambient air are all viable options for the first step of the process.

The choice of the microorganisms used in the second step is also not critical to the operation of the process of the invention. Anaerobic methane-forming bacteria are used in this step. Preferred are mixed cultures to the type encountered in digesting materials, such anaerobic digested sludges, sediments of water, or even in feces, such as for example the intestinal contents of slaughtered animals. As with the aerobic microorganisms, such sludges or sediments are used for inoculation.

The process of the invention is preferably carried out in a continuous flow reactor. Suitable continuous flow reactors are any vessels which enable wastewater to be subjected to a certain residence time with part of the wastewater being kept out of contact with air or oxygen with low-density substances being separated off.

Instead of a fat separator, as shown in the drawing, it is also possible with considerable benefits to use a sludge separator if the substances to be eliminated are higher in their density than the water. In the process of the invention, the separator function is used to collect pollutants of the wastewater, which basically have a longer degradation time, in low-flow zones, and thus to subject them to a longer residence time in the system than is the case for the residual wastewater separated therefrom. This is achieved in that if, for example, a relatively large quantity of water enters the separator during cleaning of the food factory, the main part of the water which is lightly polluted is discharged more or less directly into the receiving water through the fat separator and the pollutants to be eliminated collect in the separator and can then be biologically degraded in the resting phases.

In one embodiment of the process, it may be desirable to carry out mechanical separation during the aerobic or anaerobic step. Accordingly, preferred reactors are separators for liquids or separators for liquids and solids, of which fat separators again are particularly preferred.

In the context of the invention, the second step is understood to be the sum total of chambers or tanks which the wastewater reaches after passing through a first tank.

Separators for the separation of liquids suitable for use in accordance with the invention are known, for example, from German application Nos. 16 92 423, and 22 07 633, and from International application No. WO 83/01206. The oil separator described in GB No. 1,152,703 can also be used provided several such separators are arranged one behind the other.

In any event, it is desirable that the continuous flow reactor contain several chambers, the chamber walls being perforated so that, as the wastewater flows through, turbulence is generated in at least a part thereof, as shown in the drawing.

In designing the reactor system, the residence time of the wastewater must be taken into account. In the interests of effective treatment, the residence time in the aerobic and anaerobic steps should not be less than 3, and preferably not less than 15 minutes. Although there is no upper limit to the residence time, it is preferred—because the largest possible quantities of wastewater have to be treated in as small a continuous flow reactor as possible—to terminate the process after elimination of more than 50% and, in particular, more than 80%, or more than 90% of the organic load, depending on the quantity of microorganisms present. Typical residence times are 0.5 to 8 days, more especially 1 to 4 days.

In the practical application of the process of the invention, surge loads may occur. These are pressure surges (sudden entry of relatively large quantities of water), temperature surges (hot water), pH surges (acidic or alkaline) or increased concentrations of cleaning preparations or disinfectants. In order to avoid any interruptions in the process of the invention as a result of such surges, it is preferred to provide dead zones (flow-protected regions) in the reactor. These are zones which are in only a very slow exchange of material with the surrounding medium and in which the wastewater and the microorganisms living therein are subjected to a residence time of any duration and which, in the event of destruction of some or all of the living microorganisms, can serve as a reservoir for repopulation. Blind-ending tubes are suitable for this purpose, as shown in the drawing, particularly if they are filled with a packing or with sponges.

To avoid interruptions by pressure surges and large quantities of water, the process of the invention can be designed in such a way that some or all of the microorganisms are prevented from being washed out. To this end, part of the treated water can be returned to a preceding zone of the continuous flow reactor, as shown in the drawing. It is particularly appropriate to return an approximately 10% volume stream of the effluent to the first or second stage of the reactor.

In another embodiment of the invention, the reactor can be fitted with elements which are particularly suited to the growth of microorganisms so that part of the aerobic or anaerobic microorganisms are allowed to grow on stationary surfaces. Walls, membranes, septums, rough plastic or metal surfaces, floating packing elements, plastic sponges and the like can be used for this purpose.

In another embodiment of the invention, provision is made for the disposal of the digester gases formed. Thus, all or some of the chambers of the continuous flow reactor can be connected to a waste-gas vent, preferably comprising at least one valve to prevent the rediffusion of oxygen. On the other hand, it may be desirable to discharge the digester gases formed into the drainage system with the pretreated wastewater.

In another embodiment of the invention, part of the water flowing through the continuous flow reactor is brought into contact with the ambient air and strictly aerobic microorganisms, which live on the water surface and are capable of degrading odor-emitting substances, are allowed to grow in the contact zone. In any event, contact with air, for example on opening of an inspection port, is not critical.

In another embodiment, steps are taken against pH surges in the process of the invention. Thus, buffers or aqueous solutions thereof are added to the water to be treated. Buffers of which the solutions have a pH value of from 7 to 10 are preferred, and of these, biocompatible buffers are particularly preferred. For example, salts of the alkali metals or ammonia with carboxylic acids or phosphoric acid can be used as buffers.

In another embodiment of the process of the invention, growth-limiting deficiency elements are added to improve the microorganisms and hence to increase the degradation rate. Compounds of the elements N, P, S, K, Ca, Mg, Fe may be used. Thus, it is possible to use, for example, the ammonium or alkali metal salts of the elements N, P and S, i.e. nitrates, nitrites, phosphates and sulfates. Also, biocompatible salts can be used, preferably soluble salts of the elements potassium, calcium, magnesium and iron. Suitable lists of trace elements can be found in the literature on nutrient media for anaerobic and aerobic bacteria.

In one preferred embodiment of the process of the invention, readily digestible substances are used. This is particularly advisable at the start of operation or after interruptions. Thus, it has proven to be favorable to use carbohydrates, such as starch or sugar solutions, particularly of cane sugar, glucose syrup, or the like, at the start of operation or after interruptions in the process.

At the same time, however, acids formed during the degradation of sugar must not be allowed to reduce the pH value in the second stage to the extent that symptoms of poisoning occur. Accordingly, suitable buffers are used together with or after the carbohydrate solutions.

In the practical application of the process of the invention, substances present in the wastewater are preferably size-reduced. This can be done in principle by mechanical or chemical action. For example, emulsifiers can be used to disperse fats or a preliminary mechanical size-reduction step can be provided.

In another embodiment of the process of the invention, oxygen-consuming substances are introduced into the wastewater. Sodium thiosulfate is one example of a suitable oxygen-consuming substance. In another embodiment, iron salts which form insoluble sulfides are used to precipitate hydrogen sulfides.

In another embodiment of the present process, the wastewater is mixed as it passes through the continuous flow reactor. In addition to fixedly installed mixing elements (chicanes), continuous or discontinuous stirrers can be employed, as shown in the drawing. The mixing effect can also be obtained by passing gases through the wastewater. In this case, however, it is important to ensure that the gases used are substantially free from oxygen. Accordingly, digester gas is suitable, although nitrogen or $CO_2$ can also be used.

The process of the invention is particularly suitable for the pretreatment of wastewaters of food factories, such as for example abattoirs, meat-processing factories, large bakeries, distilleries, and the like. To carry out the process, it is preferred to carry out the cleaning and disinfection work typical of such establishments using a cleaning preparation or disinfectant which does not harm the biology of the present wastewater pretreatment system.

Accordingly, the present invention also relates to a cleaning preparation for food factories containing at least one anionic surfactant, at least one nonionic surfactant, and optionally, buffers, the trace elements described above, and auxiliaries of the type commonly used in such cleaning preparations. These cleaning preparations are normally present in the form of 10 to 70% aqueous solutions. In one preferred embodiment, they contain alkyl benzenesulfonates, alkanesulfonates, olefin sulfonates, (fatty) alcohol sulfates and/or (fatty) alcohol ether sulfates as anionic surfactants. (Fatty) alcohol polyglycol ethers or alkylphenol polyglycol ethers can be used as nonionic surfactants. In addition, the cleaning preparations of the invention can contain wetting agents, such as cumenesulfonates, or amphoteric surfactants. They can also contain glycols or alcohols which serve as solubilizers. In addition, the cleaning preparations of the invention can contain auxiliaries, dyes, preservatives, and other additives typical of such products. The cleaning preparations of the invention also preferably contain buffers to provide a pH value of from 6 to 10, and preferably from 7 to 10. The cleaning preparations of the invention can also contain trace elements, preferably compounds of the elements N, P, S, K, Ca, Mg and Fe. The concentration of buffers or trace elements in the cleaning preparations should not exceed 15% by weight or, more particularly, 5% by weight. A particularly suitable surfactant base for the cleaning preparations of the invention is provided by fatty acid alkyl ester sulfonates, alkanesulfonates, alkyl benzenesulfonates, and/or alkylphenol ethoxylates.

The cleaning preparations of the invention can contain the buffers and trace elements as such. However, the buffer solution and the solution of the trace elements can be separately used and allowed to enter the wastewater and hence the process of the invention successively or together.

In another embodiment of the invention, the trace elements used also have a buffer effect. Thus, salts such as sodium or potassium phosphates, and the associated hydrogen phosphates on the one hand have a buffering effect and, on the other hand, also serve as phosphate sources.

The present invention also relates to disinfectants which do not affect the pretreatment process of the invention in the concentrations in which they enter the wastewater. Besides the auxiliaries typically encountered in disinfectants, suitable disinfectants contain, as active substance, aldehydes, such as formaldehyde; alcohols, such as ethyl alcohol; disinfecting phenols; hypochloride or chlorine donors; organic per compounds, such as peracetic acid; or inorganic per compounds, such as perhydrol or perborates. Combinations of the above substances can also be used. However, quaternary ammonium compounds should be avoided.

Using the process, cleaning preparations, and disinfectants of the invention, it is possible to drastically reduce the amount of organic compounds entering the drainage system for abattoirs, meat-processing factories, etc. without consuming energy. The process saves energy and is not susceptible to failure.

The invention will be illustrated but not limited by the following examples.

EXAMPLES

Example 1

Three laboratory fish-rearing tanks were connected to one another by two pipes arranged just below the top edge of each tank. Perforated plates serving as flow chicanes were arranged in each tank perpendicular to the water level. The tanks were closed substantially hermetically by covers. The first tank (stage 1) contained a water inlet and the last tank a water outlet. From a storage vessel, a dispersion of fat in water (500 mg fat/l stabilized, containing an ethylene oxide/propylene oxide block copolymer as emulsifier) was passed through the system at such a rate that 10% of the total quantity of water was exchanged per hour. The first tank (stage 1) was inoculated with activated sludge and the second and third tanks (stage 2) with digested sludge. After operation for half a day, the COD value (chemical oxygen demand) in the first tank was 14,108 mg/l and, in the third tank, 2,171 mg/l.

Example 2

To stimulate a surge-like load, a sugar concentration of 2 g/liter was established in the first tank. After a short time, the pH value in tanks 2 and 3 was seen to fall so that the anaerobic fermentation process virtually stopped. When a potassium phosphate buffer (2 g/l) was simultaneously used, the anaerobic degradation process remained almost uninterrupted.

Example 3

It was found that, after a surge of acid through the rapid fermentation of sugar, the anaerobic degradation process resumed after a short time when vertical, water-filled test tubes containing glass rings as packing elements were arranged in uniform distribution in tanks 2 and 3.

Example 4

The continuous flow reactor was rinsed through with three times its volume of water in 15 minutes. It was found that the elimination of COD falls off considerably, presumably because the bacteria had been washed away. A gradual improvement was obtained when a volume stream of around 10% of the quantity of water was run off from the effluent via a metering pump and introduced into tank 2 by means of a peristaltic pump.

Example 5

In tank 3, the digester gas over the water surface was removed under suction by a pump and introduced at the bottom of the first tank. The turbulence generated produced a slight increase in the elimination rate.

Example 6

In three open, 10-liter tanks interconnected one behind the other below the water surface with a free outlet in tank 3 above the level of the connections between tanks ½ and ⅔, a water throughflow was set up so that 7 to 15 liters drinking water flow daily through the system. Tank 1 was stirred and 200 g/day domestic garbage, for example fat remains, potatoes, vegetables, paper towels, etc., were additionally introduced into this tank. The COD was measured in the first tank and came to 23,000 to 23,000 mg/l (thickly liquid, turbid, many large particles), depending on the time of measurement and the homogeneity of the material. Three layers occurred in the second tank, namely: a viscous floating layer, a sediment, and a clearly dissolved middle layer with vigorous formation of gas bubbles containing methane (digester gas).

In tank 3, little, if any, floating layer and only a very thin sediment were observed in the effluent. The COD in the effluent measured 1783, 2048 and 3760 mg/l, corresponding to a treatment success of 92-97%. The effluent was always fat-free, occassionally containing bacteria floating on top. Under these conditions, the plant operated without interruption for 6 weeks.

We claim:

1. A process for the continuous flow decentral treatment of wastewaters polluted with one or more fats, proteins, or carbohydrates comprising the steps of
   A. containing the polluted wastewater in a region containing at least one flow-protected zone, which is a packed or sponge filled blind end tube which acts as a microorganism reservoir, with both aerobic and anaerobic microorganisms for a time sufficient to at least partially degrade the pollutants in the wastewater to fermentation products;
   B. contacting the wastewater containing the fermentation products in a region containing at least one flow-protected zone, which is a packed or sponge filled blind end tube which acts as a microorganism reservoir, with anaerobic microorganisms for a time sufficient to convert most of the fermentation products and any remaining pollutants into digester gas and biomass; and
   C. separating the digester gas and biomass from the wastewater;

wherein when conditions are such in the operation of the process that microorganisms in step A or B or both are destroyed in the non-flow-protected zones of said regions, repopulating the wastewater in step A or B or both the microorganisms present in the blind end tubes.

2. The process of claim 1 wherein the residence time in step A is not less than 3 minutes.

3. The process of claim 1 wherein the residence time in step B is not less than 3 minutes.

4. The process of claim 1 wherein the residence time in each of steps A and B is in the range of from about 0.5 to about 8 days.

5. The process of claim 1 wherein the residence times in steps A and B are from about 1 to about 4 days.

6. The process of claim 1 wherein the anaerobic microorganisms used in steps A and B are mixed cultures obtained from the anaerobic part of a community sewage treatment plant.

7. The process of claim 1 wherein the anaerobic microorganisms used in steps A and B are obtained from an anaerobic digested sludge, a water sediment, or animal feces.

8. The process of claim 1 wherein both step A and step B are carried out in a fat separator or a sludge separator.

9. The process of claim 1 wherein a portion of the wastewater from step B is returned to step A.

10. The process of claim 1 wherein a fertilizing material is added to step A to provide nutrients for the microorganisms.

11. The process of claim 1 wherein a pH stabilizing material is added in step A.

12. The process of claim 11 wherein the pH stabilizing material is added in a quantity sufficient to produce a pH of from about 7 to about 10 in step A.

13. The process of claim 12 wherein the pH stabilizing material is a biologically compatible buffer.

14. The process of claim 1 wherein in step A one or more trace elements selected from the group consisting of N, P, S, K, Ca, Mg, and Fe in the form of compounds containing them are introduced into step A.

15. The process of claim 1 wherein in step A a fat dispersing emulsifier is introduced therein.

16. The process of claim 15 wherein the fat dispersing emulsifier is an anionic surfactant, a nonionic surfactant, or both.

17. The process of claim 16 wherein the surfactant is one or more of a fatty acid alkyl ester sulfonate, an alkane sulfonate, an alkyl benzene sulfonate, or an alkyl phenol ethyloxylate.

18. The process of claim 1 wherein the residence time in each of steps A and B is in the range of from about 0.5 to about 8 days, and a fertilizing material and a pH stabilizing material are added in step A.

19. The process of claim 18 wherein the process is carried out in a fat separator or a sludge separator.

20. The process of claim 19 wherein in step A a fat dispersing emulsifier is introduced therein.

21. The process of claim 18 wherein a portion of the wastewater from step B is returned to step A.

22. The process of claim 1 wherein the repopulating of the wastewater is carried out by maintaining the wastewater in the non-flow-protected zones in contact with microorganisms in the blind end tubes until repopulation of the wastewater has occurred.

* * * * *